United States Patent
Yoneda et al.

(10) Patent No.: US 8,963,382 B2
(45) Date of Patent: Feb. 24, 2015

(54) STATOR FOR ROTARY ELECTRIC MACHINE IN WHICH STATOR COILS ARE SECURED IN STATOR SLOTS USING IMPREGNATING MATERIAL

(75) Inventors: Shigenori Yoneda, Anjo (JP); Toshiaki Oohara, Okazaki (JP)

(73) Assignee: Denso Corporation, Kariya (JP)

( * ) Notice: Subject to any disclaimer, the term of this patent is extended or adjusted under 35 U.S.C. 154(b) by 540 days.

(21) Appl. No.: 13/204,049

(22) Filed: Aug. 5, 2011

(65) Prior Publication Data

US 2012/0032551 A1 Feb. 9, 2012

(30) Foreign Application Priority Data

Aug. 5, 2010 (JP) ................................. 2010-176375

(51) Int. Cl.
| | | |
|---|---|---|
| *H02K 15/12* | (2006.01) | |
| *H02K 3/04* | (2006.01) | |
| *H02K 1/06* | (2006.01) | |
| *H02K 3/48* | (2006.01) | |
| *H02K 3/12* | (2006.01) | |
| *H02K 15/00* | (2006.01) | |

(52) U.S. Cl.
CPC .. *H02K 3/48* (2013.01); *H02K 3/12* (2013.01); *H02K 15/0031* (2013.01); *H02K 15/0037* (2013.01); *H02K 15/12* (2013.01)
USPC ......... 310/45; 310/44; 310/201; 310/216.065

(58) Field of Classification Search
CPC ................................ H02K 3/34; H02K 15/06
USPC .................. 310/200, 201, 216.016, 219.019, 310/216.055, 216.091, 44, 45, 216.065
See application file for complete search history.

(56) References Cited

U.S. PATENT DOCUMENTS

2002/0011753 A1 1/2002 Asao et al.
2009/0261685 A1* 10/2009 Akimoto et al. .............. 310/207

FOREIGN PATENT DOCUMENTS

| JP | S53-032302 | 3/1978 |
| JP | 56-3557 | 1/1981 |
| JP | 56003557 A * | 1/1981 |

(Continued)

OTHER PUBLICATIONS

Machine Translation JP07274452 (1995) and JP2004364368 (2004).*

(Continued)

*Primary Examiner* — Jose Gonzalez Quinones
(74) *Attorney, Agent, or Firm* — Nixon & Vanderhye P.C.

(57) ABSTRACT

A stator includes a ring-shaped stator core having a plurality of slots arranged in a circumferential direction and a stator coil wound around the slots. The stator coil disposed within the slots is fixed by an impregnating material applied from an inner peripheral side of the stator core. An innermost-diameter coil wire of the stator coil positioned on the innermost-diameter side within the slots is provided with a first angle section that is angled towards an outward core-diameter direction side from a center section in a core-axis direction towards one end side, and a second angle section that is angled towards the outward core-diameter direction side from the center section in the core-axis direction towards another end side. The center section in the core-axis direction of the innermost-diameter coil wire projects towards an inward core-diameter direction side.

20 Claims, 7 Drawing Sheets

(56) References Cited

FOREIGN PATENT DOCUMENTS

| | | | |
|---|---|---|---|
| JP | 07274452 A | * | 10/1995 |
| JP | 2001-268837 | | 9/2001 |
| JP | 2004364368 A | * | 12/2004 |
| JP | 2006-262541 | | 9/2006 |
| JP | 2008-109733 | | 5/2008 |

OTHER PUBLICATIONS

Japanese Official Action dated Oct. 17, 2012 issued in corresponding Japanese Application No. 2010-176375, with English translation.

Office Action (7 pgs.) dated Mar. 28. 2014 issued in corresponding Chinese Application No. 201110227862.4 with an at least partial English-language translation thereof (10 pgs.).

* cited by examiner

STATOR FOR ROTARY ELECTRIC MACHINE IN WHICH STATOR COILS ARE SECURED IN STATOR SLOTS USING IMPREGNATING MATERIAL

CROSS REFERENCES TO RELATED APPLICATION

The present application relates to and incorporates by reference Japanese Patent application No. 2010-176375 filed on Aug. 5, 2010.

BACKGROUND OF THE INVENTION

1. Field of the Invention

The present invention relates to a stator for a rotary electric machine used, for example, as an electric motor or a power generator in a vehicle, and a method of manufacturing the stator.

2. Description of the Related Art

Various types of rotary electric machines are used for electric motors and power generators mounted in vehicles, and the like. A type of rotary electric machine is known that includes a ring-shaped stator core and a stator coil as a stator for the rotary electric machine. The stator core has a plurality of slots arranged in a circumferential direction. The stator coil is wound around the slots in the stator core. In the stator, the stator coil is fixed to the stator core using an impregnating material, such as varnish, to ensure vibration resistance characteristics of the stator coil.

Various techniques for ensuring vibration resistance characteristics are known. For example, JP-A-2008-109733 discloses a method in which the impregnating material is dripped from a coil end section side of the stator coil projecting from an axial-direction end surface of the stator core, thereby impregnating the inside of the slots. JP-A-2006-262541 discloses a method in which a portion of the stator core is modified and the slots are expanded. The entire work is then immersed in an impregnating material bath and impregnated with the impregnating material.

A type of stator core is known that is not provided with a shoulder section projecting in a circumferential direction on a teeth tip, to improve space factor of the coil within the slots. In a stator core such as this, when the method disclosed in JP-A-2008-109733 is used, the impregnating material cannot be retained anywhere because the shoulder section is not present on an inward radial-direction side of an innermost-diameter-side coil of the stator coil. As a result, the innermost-diameter-side coil cannot be fixed to the stator core with certainty.

In the method disclosed in JP-A-2006-262541, a problem occurs in that performance deteriorates as a result of increased magnetic resistance in the slot expansion section. In addition, a problem occurs in that, when the entire work is immersed, the impregnating material is deposited in areas in which the impregnating material should not be deposited (such as an inner peripheral surface of the stator core that may interfere with a rotor, or an engaging section or a fastening surface between the stator core and a case member).

A coil wire positioned on the innermost-diameter side within the slots is required to be fixed with certainty. Therefore, the following can be considered: the stator core around which the stator coil is wound is disposed such that its axial line is in a horizontal direction, and the impregnating material is dripped from the inner peripheral side of the stator core while the stator core is rotated around the axial line, thereby impregnating the inside of the slots. However, in this instance, the following issues arise.

In this instance, the back end of the slots in an outward core-diameter direction can be impregnated with the impregnating material by centrifugal force. However, because the impregnating material does not easily flow in a core-axis direction, the area wetted by the impregnating material decreases the closer the coil wire is to the inner diameter side, and fixing strength is difficult to attain. In addition, Lorentz force due to leakage flux increases the closer the coil wire is to the inner diameter side. Therefore, when the fixing strength of the coil wire on the inner diameter side decreases, the inner-diameter-side coil wire may run out into a gap as a result of electromagnetic vibrations and interfere with the rotor.

SUMMARY

Hence, it is desired to provide a stator for a rotary electric machine in which an inner-diameter-side coil wire can be fixed with greater certainty by improved impregnation by an impregnating material in a core-axis direction, and a method of manufacturing the stator.

To solve the above-described issues, a stator for a rotary electric machine of an exemplary embodiment includes: a ring-shaped stator core having a plurality of slots arranged in a circumferential direction; a stator coil wound around the slots in the stator core; and an impregnating material applied from an inner peripheral side of the stator core that fixes the stator coil disposed within the slots. An innermost-diameter coil wire of the stator coil positioned on an innermost-diameter side within the slots has at least one of a first angle section that is angled towards an outward core-diameter direction side from one end side in a core-axis direction towards another end side, and a second angle section that is angled towards the outward core-diameter direction side from the other end side in the core-axis direction towards the one end side.

According to the above-described configuration, when the impregnating material is applied from the inner peripheral side of the stator core, the applied impregnating material enters the slot from the inner peripheral surface of the stator core and first reaches the innermost-diameter coil wire positioned on the innermost-diameter side within the slot. The innermost-diameter coil wire has at least one of the first angle section and the second angle section. Therefore, the impregnating material that has reached the innermost-diameter coil wire flows in the core-axis direction through the first angle section or the second angle section. Therefore, the impregnating material can be applied over a wide area in the core-axis direction of the innermost-diameter coil wire. The area wetted by the impregnating material is increased. As a result, permeation of the impregnating material in the core-axis direction can be improved, and fixing of the innermost-diameter coil wire by the impregnating material can be performed with greater certainty.

Because the impregnating material is applied from the inner peripheral side of the stator core, at least one of the first angle section and the second angle section is provided in only the innermost-diameter coil wire. However, when three or more coil wires are disposed within the slots, angle sections similar to the angle section provided in the innermost-diameter coil wire may be provided in second and subsequent coil wires from the inner diameter side. As a result, permeation of the impregnating material in the core-axis direction can be further improved, and fixing of the innermost-diameter coil wire can be performed with even greater certainty.

To achieve the above-described object, a method of manufacturing a stator of another exemplary embodiment is a method of manufacturing a stator for a rotary electric machine that includes a ring-shaped stator core having a plurality of slots arranged in a circumferential direction, and a stator coil wound around the slots in the stator core, and in which the stator coil disposed within the slots is fixed by an impregnating material applied from an inner peripheral side of the stator core. The method of manufacturing a stator includes: a formation step of forming, in an innermost-diameter coil wire of the stator coil positioned on an innermost-diameter side within the slots, at least one of a first angle section that is angled towards an outward core-diameter direction side from one end side in a core-axis direction towards another end side, and a second angle section that is angled towards the outward core-diameter direction side from the other end side in the core-axis direction towards the one end side; and an application step of applying the impregnating material from the inner peripheral side of the stator core while the stator core around which the stator coil is wound is disposed such that an axial line of the stator core is in a horizontal direction and the stator core is rotated around the axial line.

According to the above-described configuration, because the formation step and the application step are provided, permeation of the impregnating material in the core-axis direction is improved, and the innermost-diameter coil wire can be fixed with greater certainty.

Operational effects other than those described above will be made clear through embodiments described with reference to the drawings below.

BRIEF DESCRIPTION OF THE DRAWINGS

In the accompanying drawings:

FIG. 2A and FIG. 2B are diagrams of a stator according to the first embodiment, in which FIG. 2A is a planar view of the stator and FIG. 2B is a front view of the stator viewed laterally;

FIG. 7A and FIG. 7B are diagrams schematically showing a method of manufacturing the stator according to the first embodiment, in which FIG. 7A is a cross-sectional view of the stator taken along an axial direction, and FIG. 7B is an enlarged partial cross-sectional view of main sections in FIG. 7A;

FIG. 10A and FIG. 10B are diagrams schematically showing a method of manufacturing a stator according to a second embodiment, in which FIG. 10A is a cross-sectional view of the stator taken along an axial direction, and FIG. 10B is an enlarged partial cross-sectional view of main sections in FIG. 10A.

DETAILED DESCRIPTION OF THE PREFERRED EMBODIMENTS

Embodiments specifying a stator for a rotary electric machine and a method of manufacturing the stator of the present invention will hereinafter be described in detail with reference to the drawings.

First Embodiment

A stator and a method of manufacturing the stator according to a first embodiment will be described with reference to FIG. 1 to FIG. 9.

Figure 1:
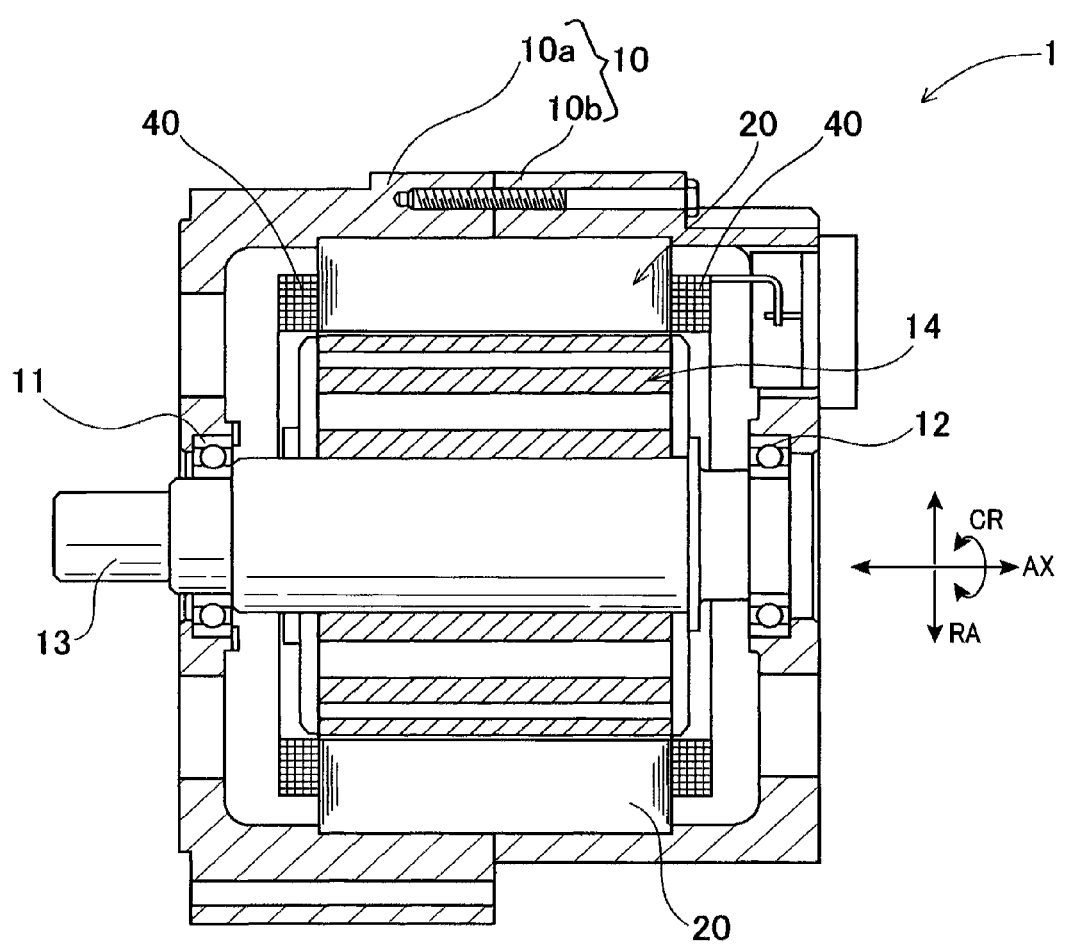
FIG. 1 is an axial-direction cross-sectional view schematically showing a configuration of a rotary electric machine according to a first embodiment.
Figure 2A:
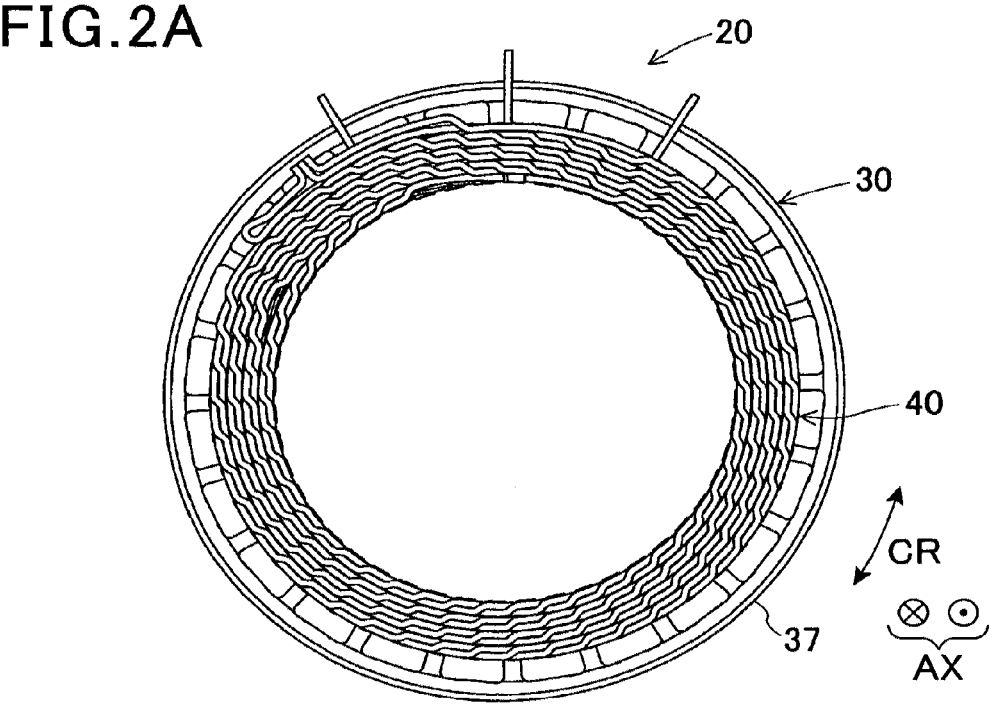
Figure 2B:
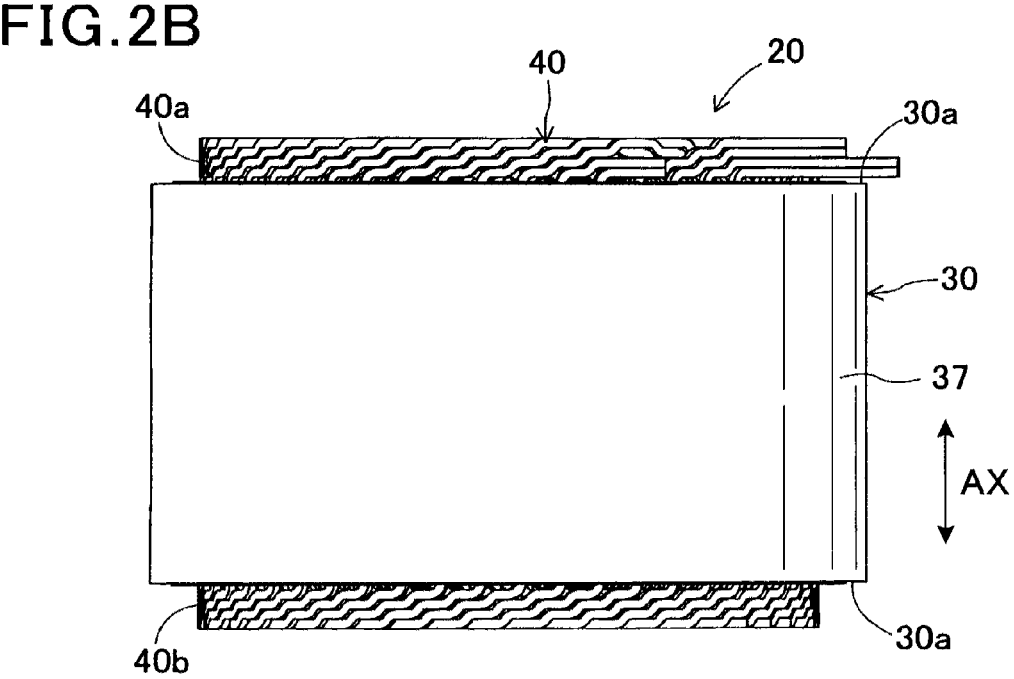

FIG. 1 is an axial-direction cross-sectional view schematically showing a configuration of a rotary electric machine 1 according to the first embodiment. FIG. 2A and FIG. 2B are diagrams of a stator according to the first embodiment. FIG. 2A is a planar view of the stator, and FIG. 2B is a front view of the stator viewed laterally.

The rotary electric machine 1 according to the first embodiment includes a housing 10, a rotor 14, and a stator 20. The housing 10 is composed of a pair of bottomed, roughly cylindrical housing members 10a and 10b, of which the opening sections are bonded together. The rotor 14 is fixed to a rotary shaft 13 supported in the housing 10 by bearings 11 and 12, such as to rotate freely.

In the present embodiment, as shown in FIG. 1, the longitudinal directions of the rotary shaft 13 is defined as an axial direction(s) AX, which is also called "core-axis direction", as will be explained later, radial directions extended from the axial directions AX are defined as a radial direction(s) RA, and directions around the axial direction AX are defined as circumferential direction(s) CR.

The stator 20 is fixed to the housing 10 in a position surrounding the rotor 14 within the housing 10. The rotor 14 forms a plurality of magnetic poles with differing magnetic polarities in an alternating manner in the circumferential direction CR using permanent magnets, on an outer peripheral side facing an inner peripheral side of the stator 20 in the radial direction RA. The number of magnetic poles of the rotor 14 differs depending on the rotary electric machine, and therefore, is not limited. According to the first embodiment, a rotor with eight poles (four N poles and four S poles) is used. As shown in FIG. 2A and FIG. 2B, the stator 20 includes a stator core 30 and a three-phase stator coil 40. The stator core 30 is composed of a plurality of divided cores 32. The stator coil 40 is composed of a plurality of conducting wires. Insulating paper may be disposed between the stator core 30 and the stator coil 40.

Figure 3:
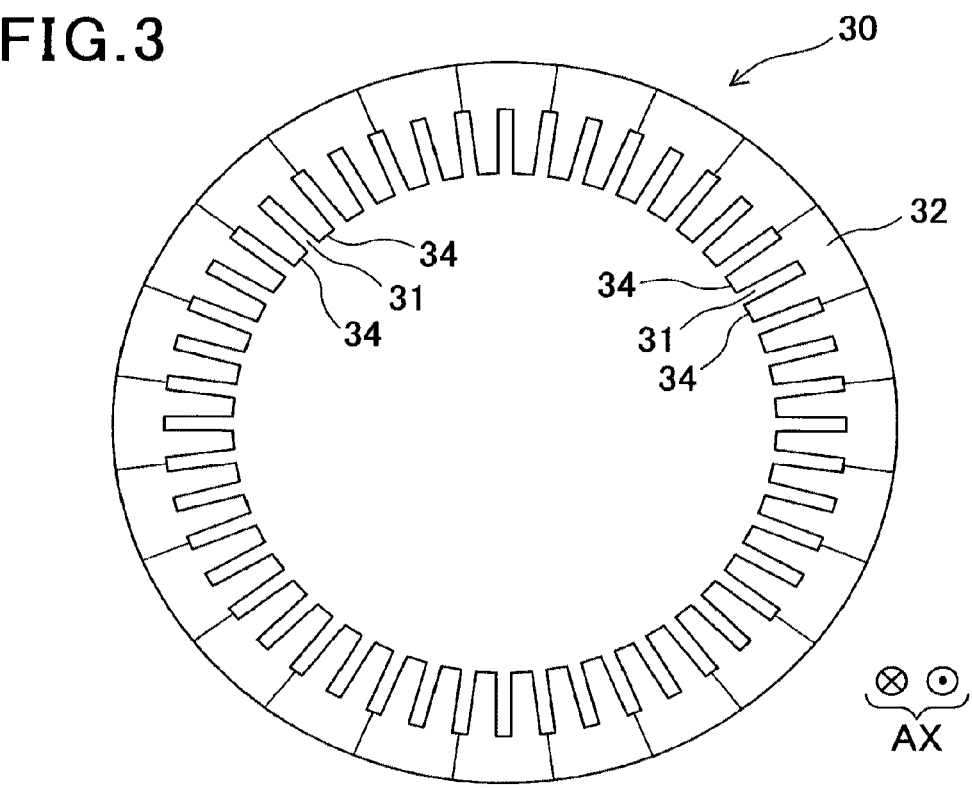
FIG. 3 is a planar view of a stator core according to the first embodiment.
Figure 4:
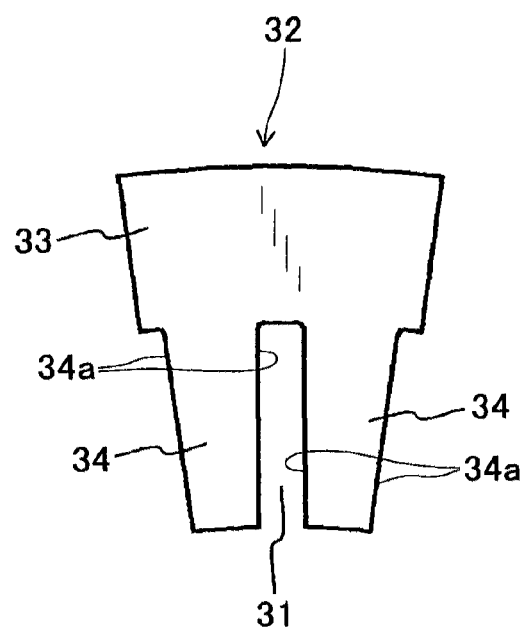
FIG. 4 is a planar view of a divided core according to the first embodiment.

Next, the stator core 30 will be described with reference to FIG. 3 and FIG. 4. FIG. 3 is a planar view of the stator core 30 according to the first embodiment. FIG. 4 is a planar view of the divided core 32 according to the first embodiment. As shown in FIG. 3 and FIG. 4, the stator core 30 is formed into a ring shape by the plurality of divided cores 32 (twenty-four divided cores 32 according to the first embodiment) divided in the circumferential direction CR. The stator core 30 has a plurality of slots 31 arranged in the circumferential direction CR on the inner peripheral side thereof. The stator core 30 is composed of a ring-shaped back core section 33 positioned on the outer peripheral side, and a plurality of teeth 34 provided projecting in an inward radial direction from the back core section 33. The plurality of teeth 34 are arranged with a predetermined amount of space therebetween in the circumferential direction CR. As a result, the slots 31 that are open on the inner peripheral side of the stator core 30 and extend in the radial direction RA are formed between opposing side surfaces 34a of adjacent teeth 34 in the circumferential direction CR. The side surfaces 34a of the adjacent teeth 34 opposing each other in the circumferential direction CR, or in other words, the pair of side surfaces 34a segmenting a single slot 31 are parallel planes parallel to each other. As a result, each slot 31 extends in the radial direction RA with a constant circumferential width. A shoulder section that projects in the circumferential direction CR is not provided on the side surfaces 34a in a projection tip section of the teeth 34.

According to the first embodiment, the stator coil 40 is a double-slot distributed winding. Therefore, two slots 31 are provided per phase of the stator coil 40, for the number of magnetic poles (eight magnetic poles) of the rotor. In other words, forty-eight slots 31 are formed (8×3×2=48). In this instance, the forty-eight slots 31 are formed by the same number of teeth 34, or in other words, forty-eight teeth 34.

The divided cores 32 configuring the stator core 30 are formed by a plurality of electromagnetic steel plates formed into a predetermined shape by press-punching being stacked in the axial direction AX of the stator core 30. The stator core 30 is fixed (shape-retained) in the ring shape by an outer cylinder 37 being fitted onto the outer periphery of the divided cores 32 disposed in the ring shape (see FIG. 2A).

Figure 5:
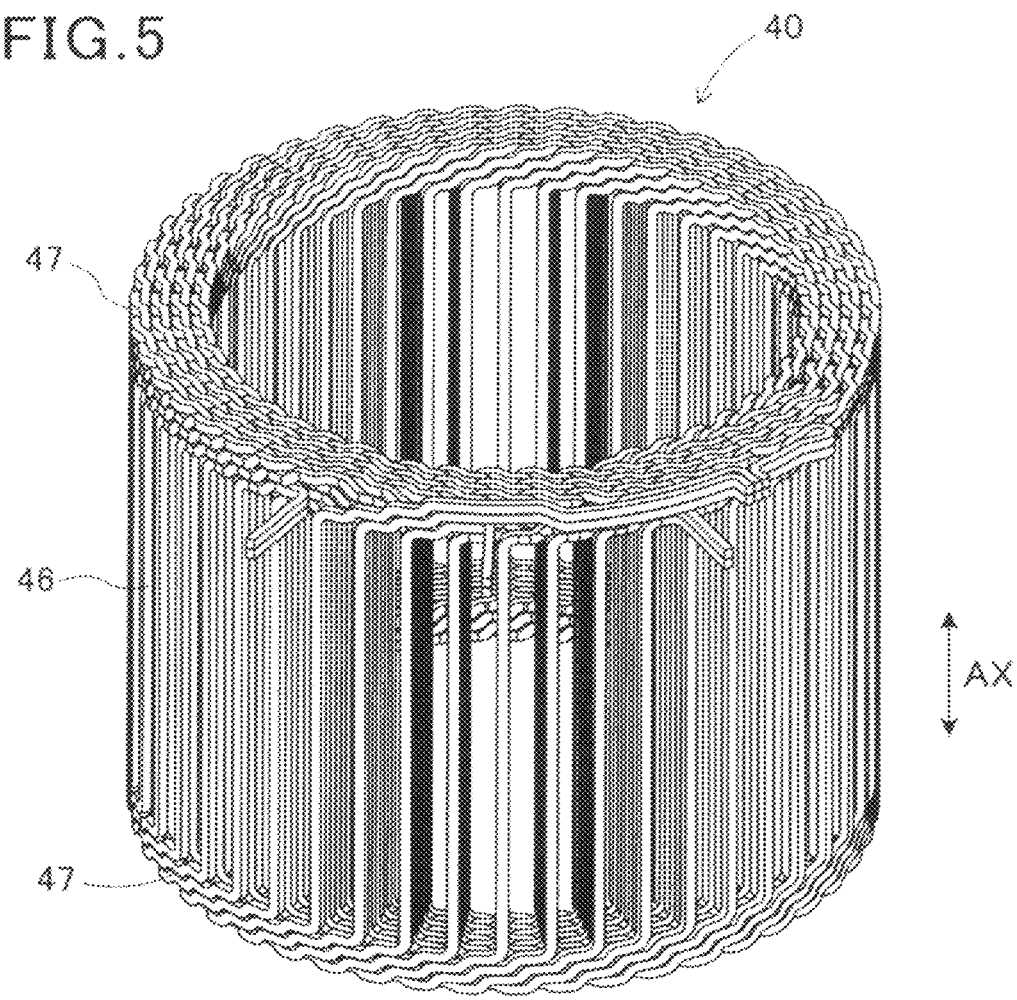
FIG. 5 is a perspective view of a stator coil according to the first embodiment.
Figure 6:
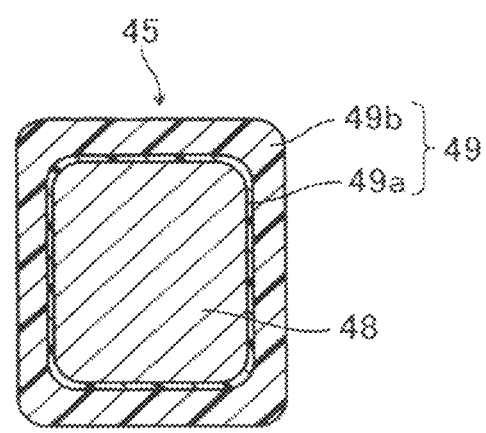
FIG. 6 is a cross-sectional view of a coil wire configuring the stator coil according to the first embodiment.

As shown in FIG. 5, the stator coil 40 forms a band-shaped conducting wire bundle in which a predetermined number of conducting wires (coil wires) 45 (twelve conducting wires 45 according to the first embodiment) formed into a predetermined waveform shape are stacked in a predetermined state. The conducting wire bundle is wound into a spiral, thereby forming a cylindrical shape. The conducting wires 45 configuring the stator coil 40 are formed into a waveform shape having slot-housed sections (i.e., sections to be housed in the slots when being assembled with the stator core) 46 and turn sections 47. The slot-housed sections 46 are thus set in the slots 31 of the stator core 30. The turn section 47 interconnect the slot-housed sections 46, housed in different slots 31 in the circumferential direction CR, outside of the slots 31. As shown in FIG. 6, an insulation-coated flat wire composed of a copper conductor 48 with a rectangular cross-section and an insulation film 49 is used as the conducting wire 45. The insulation film 49 has an inner layer 49a and an outer layer 49b, and covers the outer periphery of the conductor 48. The thickness of the insulation film 49, namely the combined thickness of the inner layer 49a and the outer layer 49b, is set within a range of 100 μm to 200 μm.

The stator coil 40 is assembled with the stator core 30 in the following manner. In other words, the teeth sections 34 of each divided core 32 are inserted from the outer peripheral side into the stator coil 40. After all divided cores 32 are disposed in a ring shape along the stator coil 40, the cylindrical outer cylinder 37 is fitted around the outer periphery of the divided cores 32. As a result, as shown in FIG. 2, the stator coil 40 is assembled in a state in which the predetermined slot-housed sections 46 of each conducting wire 45 are housed within the predetermined slots 31 of the stator core 30.

In this instance, the slot-housed sections 46 of each conducting wire 45 are housed in the slots 31 for each of a predetermined number of slots (three phases multiplied by two slots (double slots) equal six slots according to the first embodiment). In each slot 31, a predetermined number of coil wires (ten coil wires according to the first embodiment) (slot-housed sections 46 of the conducting wires 45) are disposed such as to be arranged in a single row in the core-diameter direction. In addition, the turn sections 47 that interconnect adjacent slot-housed sections 46 of the conducting wires 45 each project from both end surfaces 30a in the axial direction AX of the stator core 30. As a result of the numerous projecting turn sections 47, coil end sections 40a and 40b are formed in both axial-direction end sections of the stator coil 40 (see FIG. 2B).

Then, to ensure vibration resistance characteristics of the stator coil 40 assembled to the stator core 30, a procedure for fixing the stator coil 40 to the stator core 30 through application of an impregnating material is performed. According to the first embodiment, before an impregnating material application procedure is performed, first, an angle section formation procedure is performed. The angle section formation procedure forms a first angle section 42 and a second angle section 43 in an innermost-diameter coil wire 41 of the stator coil 40, the innermost-diameter coil wire 41 being positioned on the innermost-diameter side within the slots 31. In this instance, in the angle section formation procedure, ring members 61a and 61b are respectively inserted into the inner peripheral side of both coil end sections 40a and 40b of the stator coil 40 projecting from the axial-direction end surfaces of the stator core 30. The coil end sections 40a and 40b are thereby enlarged in diameter (see FIG. 7A). As a result, in the innermost-diameter coil wire 41 of the stator coil 40, positioned on the innermost-diameter side within the slots 31, the first angle section 42 and the second angle section 43 are formed. The first angle section 42 is angled towards the outward core-diameter direction side, from one end side in the core-axis direction (left side in FIG. 7A) towards the other end side (right side in FIG. 7A). The second angle section 43 is angled towards the outward core-diameter direction side, from the other end side in the core-axis direction to the one end side. The first angle section 42 and the second angle section 43 intersect in an intermediate section (roughly center section) in the core-axis direction of the innermost-diameter coil wire 41. The intersecting section forms a projecting section 44 that projects furthest towards the inward core-diameter direction side.

Figure 7A:
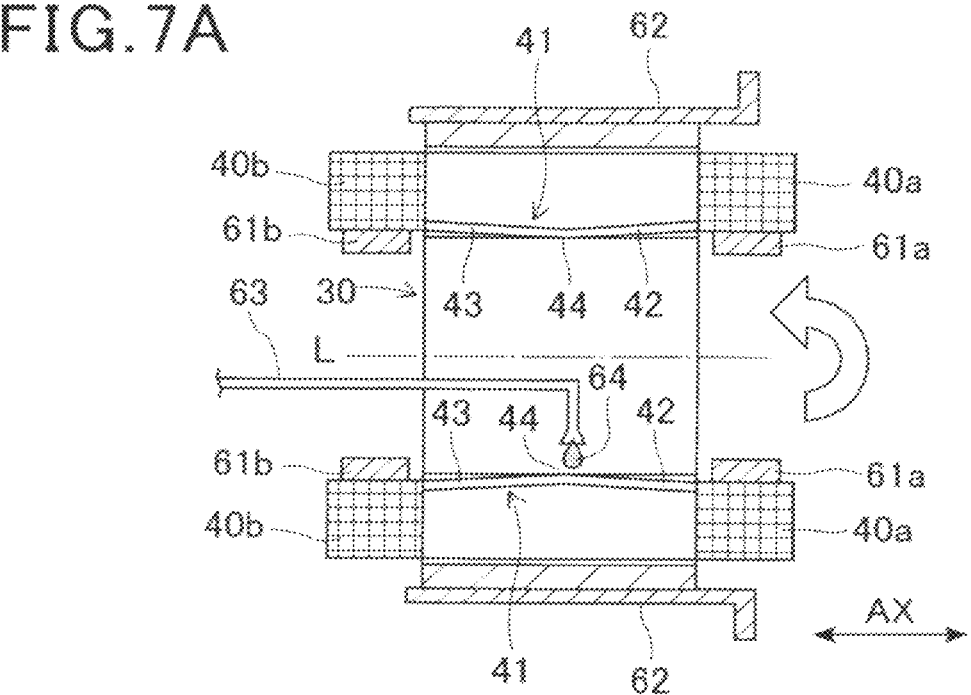

When the first angle section 42 and the second angle section 43 of the innermost-diameter coil wire 41 are formed by the ring member 61a and the ring member 61b, angle sections similar to the first angle section 42 and the second angle section 43 of the innermost-diameter coil wire 41 are also formed in the second to fourth coil wires from the inner diameter side within the slots 31, However, the angle of the angle sections in the second to fourth coil wires from the inner diameter side decreases the farther the coil wire is from the inner diameter side. Next, as shown in FIG. 7A, the stator core 30 in which the first angle section 42 and the second angle section 43 are formed is held in a holding section 62 of a rotating device such that an axial line L of the stator core 30 is in a horizontal direction. Then, while the rotating device rotates the stator core 30 around the axial line L, an impregnating material 64 is dripped towards the roughly center section in the axial direction AX (the projecting section 44 of the innermost-diameter coil wire 41) on the inner peripheral surface of the stator core 30, from an impregnating material outlet of a nozzle 63 disposed on the inner peripheral side of the stator core 30.

Figure 7B:
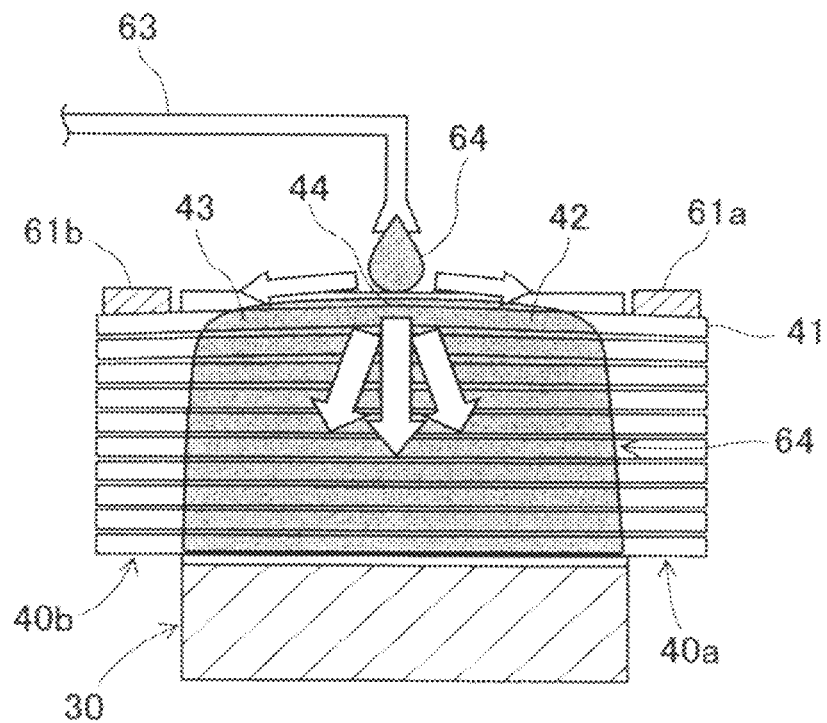
Figure 8:
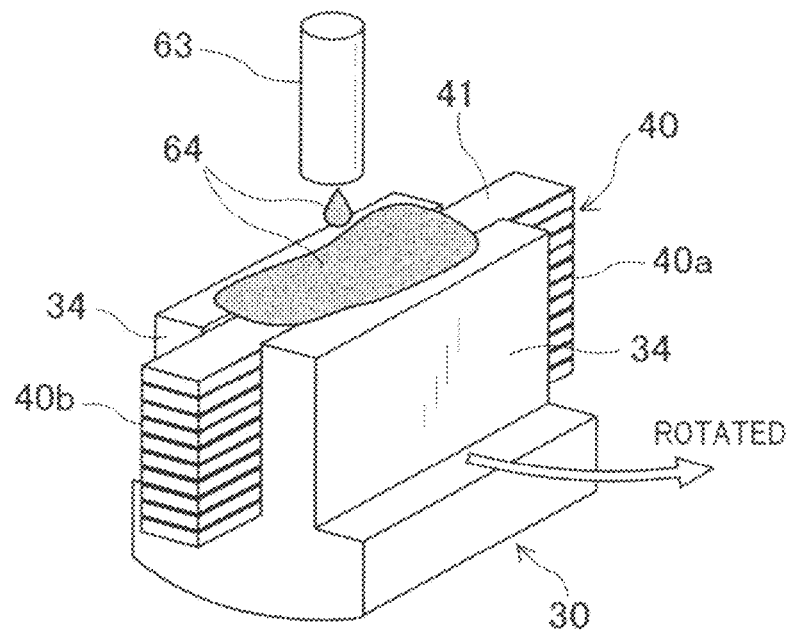
FIG. 8 is a partial perspective view of main sections of the stator and schematically shows the method of manufacturing the stator according to the first embodiment.

As shown in FIG. 7B and FIG. 8, the dripped impregnating material 64 enters the slot 31 from the inner peripheral surface of the stator core 30 and reaches at the projecting section 44 of the innermost-diameter coil wire 41 positioned on the innermost-diameter side within the slot 31. The impregnating material 64 that has reached the projecting section 44 flows from the center section in the core-axis direction to both sides, through the first angle section 42 and the second angle section 43. The impregnating material 64 is thereby applied over a wide area in the core-axis direction of the innermost-diameter coil wire 41. At this time, the impregnating material 64 applied to the innermost-diameter coil wire 41 permeates to the back of the slot 31 in the outward radial direction as a result of the effect of centrifugal force accompanying the rotation of the stator core 30. As a result, the impregnating material 64 impregnates roughly the overall area in the core-axis direction within the slot 31.

Then, as a result of solidification of the impregnating material 64 that has impregnated the slots 31, the stator coil 40 (slot-housed sections 46) within the slots 31 is fixed to the stator core 30, thereby ensuring vibration resistance characteristics. In particular, according to the first embodiment, as a result of the first angle section 42 and the second angle section 43 provided in the innermost-diameter coil wire 41, the impregnating material 64 flows to both end sections of the to innermost-diameter coil wire 41. Therefore, the innermost-diameter coil wire 41 is fixed firmly and with certainty.

Figure 9:
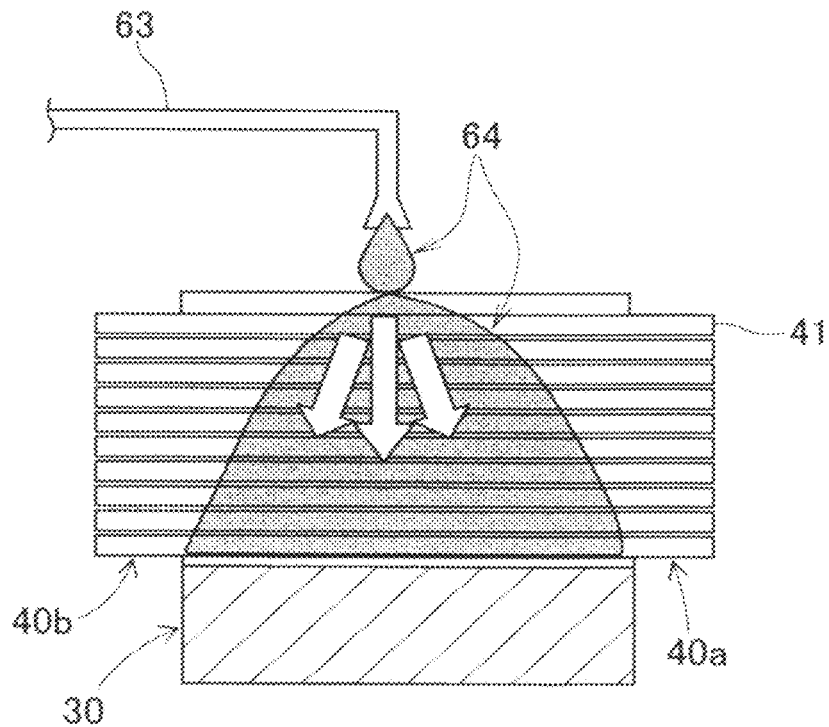
FIG. 9 is a partial cross-sectional view of main sections corresponding to FIG. 7B and schematically shows a method of manufacturing a stator of a comparative example 1.

As shown in FIG. 9 as a comparative example 1, when the first angle section 42 and the second angle section 43 are not provided in the innermost-diameter coil wire 41, the impregnating material 64 dripped from the impregnating material outlet of the nozzle 63 disposed on the inner peripheral side of the stator core 30 towards the roughly center section in the axial direction AX of the inner peripheral surface of the stator core 30 impregnates the back of the slot 31 in the outward radial direction without flowing to both end sections in the core-axis direction of the innermost-diameter coil wire 41. Therefore, fixing of the innermost-diameter coil wire 41 by the solidified impregnating material 64 is difficult to perform with certainty.

In the stator 20 of the rotary electric machine 1 according to the first embodiment configured as described above, the first angle section 42 and the second angle section 43 are provided in the innermost-diameter coil wire 41 positioned on the innermost-diameter side within the slots 31. Therefore, after the impregnating material 64 is applied from the inner peripheral side of the stator core 30, the impregnating material 64 can be applied over a wide area in the core-axis direction of the innermost-diameter coil wire 41. As a result, because permeation of the impregnating material 64 in the core-axis direction can be improved, fixing of the innermost-diameter coil wire 41 by the impregnating material 64 can be performed with greater certainty.

According to the first embodiment, the innermost-diameter coil wire 41 has the projecting section 44 that projects towards the inward core-diameter direction side in the roughly center section in the core-axis direction where the first angle section 42 and the second angle section 43 intersect. Therefore, as a result of the impregnating material 64 being applied towards the projecting section 44 of the innermost-diameter coil wire 41, the impregnating material 64 can be sent to both end sections in the core-axis direction. Thus, the impregnating material 64 can be applied over the overall area in the core-axis direction of the innermost-diameter coil wire 41. As a result, because permeation of the impregnating material 64 in the core-axis direction can be further improved, the innermost-diameter coil wire 41 can be fixed with greater certainty.

In addition, the stator coil 40 according to the first embodiment is composed of flat coil wires (conducting wires 45) having a rectangular cross-section in a direction perpendicular to an extending direction. The flat coil wires (conducting wires 45) are arranged in a single row in the core-diameter direction within the slots 31. Therefore, the space factor of the coil wires (conducting wires) within the slots 31 can be improved.

In addition, in the method of manufacturing the stator 20 according to the first embodiment, because the above-described angle section formation procedure and the impregnating material application procedure are performed, permeation of the impregnating material 64 in the core-axis direction is improved. The stator 20 in which the innermost-diameter coil wire 41 can be fixed with greater certainty can be easily manufactured.

In addition, in the impregnating material application procedure, the impregnating material 64 is applied onto the projecting section 44 that projects furthest to the inward core-diameter direction side of the innermost-diameter coil wire 41. Therefore, the impregnating material 64 can be applied with certainty over a wide area in the core-axis direction of the innermost-diameter coil wire 41.

In the angle section formation procedure, the ring members 61a and 61b are respectively inserted into both coil end sections 40a and 40b of the stator coil 40. The first angle section 42 and the second angle section 43 are thus formed by as a result of the diameters of the coil end sections 40a and 40b being enlarged. Therefore, the first angle section 42 and the second angle section 43 can be formed in a state in which the intermediate section in the axial direction AX of the innermost-diameter coil wire 41 is projecting towards the inward core-diameter direction side.

Second Embodiment

Next, a stator for a rotary electric machine and a method of manufacturing the stator according to a second embodiment of the present invention will be described with reference to FIG. 10A and FIG. 10B.

Figure 10A:
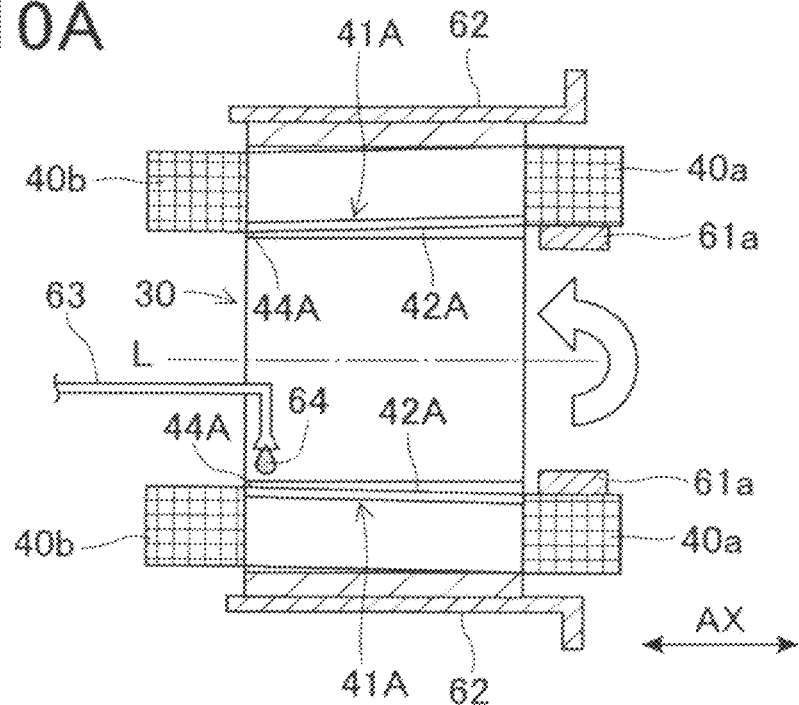
Figure 10B:
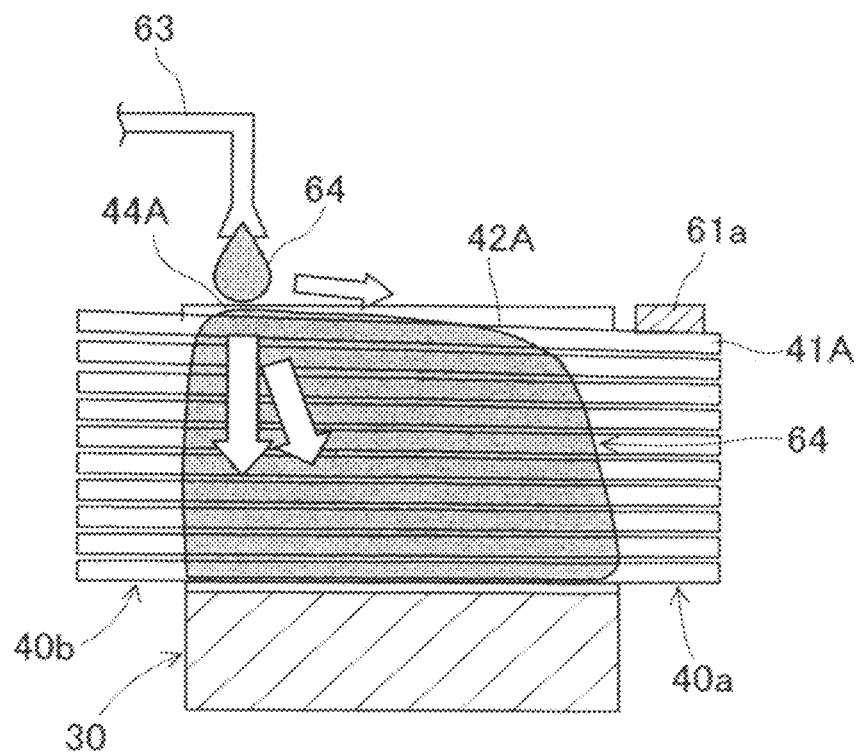

FIG. 10A and FIG. 10B are diagrams schematically showing the method of manufacturing the stator according to the second embodiment. FIG. 10A is a cross-sectional view of the stator taken along the axial direction AX. FIG. 10B is an enlarged partial cross-sectional view of main sections in FIG. 10A. The innermost-diameter coil wire 41 according to the above-described first embodiment has the first angle section 42 and the second angle section 43. The intermediate section in the core-axis direction projects furthest towards the inward core-diameter direction side. The stator 20 according to the second embodiment differs from that according to the first embodiment only in that an innermost-diameter coil wire 41A has only a first angle section 42A that is angled towards the outward core-diameter direction side, from one end side (left side in FIG. 10A) in the core-axis direction to the other end side (right side in FIG. 10A), and the one end section in the core-axis direction projects furthest towards the inward core-diameter direction side. Therefore, components shared with the first embodiment are given the same reference numbers, and detailed descriptions thereof are omitted. The differences are described hereafter.

As shown in FIG. 10A, the first angle section 42A according to the second embodiment is formed by the ring member 61a being inserted into the inner peripheral side of one coil end section 40a of the two coil end sections 40a and 40b of the stator coil 40, and the coil end section 40a being enlarged in diameter. As a result, the first angle section 42A that is angled towards the outward core-diameter direction side, from the one end side in the core-axis direction (left side in FIG. 10A) towards the other end side (right side in FIG. 10A), is formed over the entire length of the innermost-diameter coil wire 41A. According to the second embodiment, one end section in the core-axis direction of the innermost-diameter coil wire 41A forms a projecting section 44A that projects furthest towards the inward core-diameter direction side.

When the first angle section 42A of the innermost-diameter coil wire 41A is formed by the ring member 61a, angle sections similar to the first angle section 42A of the innermost-diameter coil wire 41A are also formed in the second to fourth coil wires from the inner diameter side within the slots 31. However, the angle of the angle section in the second to fourth coil wires from the inner diameter side decreases the farther the coil wire is from the inner diameter side.

According to the second embodiment, as shown in FIG. 10A, the stator core 30 in which the first angle section 42A is formed by the ring member 61a is held in the holding section 62 of the rotating device such that the axial line L of the stator core 30 is in the horizontal direction. Then, while the rotating device rotates the stator core 30 around the axial line L, the impregnating material 64 is dripped towards the one end section (the projecting section 44A of the innermost-diameter coil wire 41A) in the axial direction AX on the inner peripheral surface of the stator core 30, from the impregnating material outlet of the nozzle 63 disposed on the inner peripheral side of the stator core 30.

As shown in FIG. 10B, the dripped impregnating material 64 enters the slot 31 from the inner peripheral surface of the stator core 30 and reaches at the projecting section 44A of the innermost-diameter coil wire 41A positioned on the innermost-diameter side within the slot 31. The impregnating material 64 that has reached the projecting section 44A flows from the one end section in the core-axis direction to the other end side, through the first angle section 42A. The impregnating material 64 is thereby applied over a wide area in the core-axis direction of the innermost-diameter coil wire 41A. At this time, the impregnating material 64 applied to the innermost-diameter coil wire 41A permeates to the back of the slot 31 in the outward radial direction as a result of the effect of centrifugal force accompanying the rotation of the stator core 30. As a result, the impregnating material 64 impregnates roughly the overall area in the core-axis direction within the slot 31.

Then, as a result of solidification of the impregnating material 64 that has impregnated the slots 31, the stator coil 40 (slot-housed sections 46) within the slots 31 is fixed to the stator core 30, thereby ensuring vibration resistance characteristics. According to the second embodiment as well, as a result of the first angle section 42A provided in the innermost-diameter coil wire 41A, the impregnating material 64 flows from the one end section to the other end section of the innermost-diameter coil wire 41A. Therefore, the innermost-diameter coil wire 41A is fixed firmly and with certainty.

In the stator 20 of the rotary electric machine 1 according to the second embodiment configured as described above, the first angle section 42A formed continuously from one end section in the core-axis direction to the other end section is provided in the innermost-diameter coil wire 41A positioned on the innermost-diameter side within the slots 31. Therefore, when the impregnating material 64 is applied from the inner peripheral side of the stator core 30, the impregnating material 64 can be applied over a wide area in the core-axis direction of the innermost-diameter coil wire 41A in a manner similar to that according to the first embodiment. As a result, because permeation of the impregnating material 64 in the core-axis direction can be improved, fixing of the innermost-diameter coil wire 41A by the impregnating material 64 can be performed with greater certainty.

The present invention is not limited to the above-described embodiments. Various modifications can be made without departing from the scope of the present invention.

For example, according to the first and second embodiments, the ring members 61a and 61b are inserted into the inner peripheral sides of the coil end sections 40a and 40b of the stator coil 40, and the first angle section 42 and the second angle section 43 are formed in the innermost-diameter coil wire 41 and the first angle section 42A is formed in the innermost-diameter coil wire 41A, before the stator core 30 around which the stator coil 40 is wound is held in the holding section 62 of the rotating device. However, the ring members 61a and 61b may be inserted into the inner peripheral sides of the coil end sections 40a and 40b of the stator coil 40, and the first angle section 42 and the second angle section 43 may be formed in the innermost-diameter coil wire 41 and the first angle section 42A may be formed in the innermost-diameter coil wire 41A, after the stator core 30 around which the stator coil 40 is wound is held in the holding section 62 of the rotating device and before the impregnating material 64 is applied.

Furthermore, according to the first and second embodiments, when the impregnating material 64 is applied, the impregnating material 64 is applied onto the projecting sections 44 and 44A that project furthest towards the inward core-axis direction side of the innermost-diameter coil wires 41 and 41A. However, the impregnating material 64 may be applied while vibrating the impregnating material outlet of the nozzle 63 disposed on the inner peripheral side of the stator core 30 in the core-axis direction. As a result, permeation of the impregnating material 64 in the core-axis direction can be improved, and the impregnating material 64 can be applied over the overall innermost-diameter coil wires 41 and 41A in the core-axis direction with greater certainty. In addition, localized deposition of the impregnating material 64 in the core-axis direction can be suppressed. Such effects are particularly advantageous when the first angle section 42 and the second angle section 43 provided in the innermost-diameter coil wire 41 and the first angle section 42A in the innermost-diameter coil wire 41A cannot be set to a sufficiently large angle.

The present invention may be embodied in other specific forms without departing from the spirit or essential characteristics thereof. The present embodiments are therefore to be considered in all respects as illustrative and not restrictive, the scope of the present invention being indicated by the appended claims rather than by the foregoing description and all changes which come within the meaning and range of equivalency of the claims are therefore intended to be embraced therein.

What is claimed is:

1. A stator for a rotary electric machine comprising:
a cylindrical stator core having an axial direction, a radial direction and a circumferential direction, wherein a plurality of slots are arranged in the stator core in the circumferential direction and are opened outside from an inner peripheral surface of the stator core in the radial direction;
a stator coil wound through the slots of the stator core; and
an impregnating material applied to the plurality of slots from an inner peripheral side of the stator core such that the applied impregnating material fixes the stator coil disposed within the slots, wherein
the stator coil includes a plurality of coil wire portions disposed in each of the slots, the coil wire portions including an innermost-diameter coil wire positioned on an innermost-diameter side within each of the slots in the radial direction, the innermost-diameter coil wire has at least one of a first angle section that is angled towards outward in the radial direction as axial positions on the stator advance from one end side to the other end side in the axial direction, and a second angle section that is angled towards outward from the other end side to the one side in the axial direction.

2. The stator according to claim 1, wherein the impregnating material is a material applied to the plurality of slots after the coil wire portions of the stator coil have been disposed in the respective slots.

3. The stator according to claim 2, wherein both the first angle section and the second angle section are intergrated so as to produce a section projecting inward in the radial direction.

4. The stator according to claim 2, wherein the innermost-diameter coil wire has either of the first angle section and the second angle section, and either one end section or the other end section projects towards inward in the radial direction.

5. The stator according to claim 2, wherein the stator coil is composed of an insulation-coated flat coil wire having a rectangular cross-section perpendicularly to an extending direction of the flat coil wire, and the flat coil wire includes the coil wire portions layered on one another in the radial direction.

6. The stator according to claim 1, wherein the stator coil is composed of an insulation-coated flat coil wire having a rectangular cross-section perpendicularly to an extending direction of the flat wire, and the flat coil wire includes the coil wire portions layered on one another in the radial direction.

7. The stator according to claim 3, wherein the stator coil is composed of an insulation-coated flat coil wire having a rectangular cross-section perpendicularly to an extending direction of the flat coil wire, and the flat coil wire includes the coil wire portions layered on one another in the radial direction.

8. A method of manufacturing a stator for a rotary electric machine that includes a cylindrical stator core having an axial direction, a radial direction and a circumferential direction, wherein a plurality of slots are arranged in the stator core in the circumferential direction and are opened outside from an inner peripheral surface of the stator core in the radial direction, a stator coil wound through the slots of the stator core, the stator coil including a plurality of coil wire portions disposed in each of the slots, and an impregnating material applied to the plurality of slots from an inner peripheral side of the stator core such that the applied impregnating material fixes the stator coil disposed within the slots, the method comprising:

a formation step of forming, in an innermost-diameter coil wire of the plurality of coil wire portions positioned on an innermost-diameter side within each of the slots in the radial direction, at least one of a first angle section that is angled towards outward in the radial direction as axial positions on the stator advance from one end side to the other end side in the axial direction, and a second angle section that is angled towards outward from the other end side to the one end side in the axial direction; and an application step of applying the impregnating material from the inner peripheral side of the stator core while the stator core around which the stator coil is wound is disposed such that an axial line of the stator core is in a horizontal direction and the stator core is rotated around the axial line.

9. The method of manufacturing a stator for a rotary electric machine according to claim 8, wherein the application step applies the impregnating material on a projecting section that projects furthest towards an inward core-diameter direction side of the innermost-diameter coil wire.

10. The method of manufacturing a stator for a rotary electric machine according to claim 9, wherein the application step applies the impregnating material while vibrating an impregnating material outlet of a nozzle disposed on the inner peripheral side of the stator core in a core-axis direction.

11. The method of manufacturing a stator for a rotary electric machine according to claim 10, wherein the formation step inserts a ring member that enlarges a diameter of a coil end section into an inner peripheral side of each end section of the stator coil projecting from axial-direction end surfaces of the stator core, and forms the first angle section and the second angle section.

12. The method of manufacturing a stator for a rotary electric machine according to claim 10, wherein the formation step inserts a ring member for enlarging a diameter of a coil end section into an inner peripheral side of either coil end section of the stator coil that each projects from the axial-direction end surfaces of the stator core.

13. The method of manufacturing a stator for a rotary electric machine according to claim 8, wherein the application step applies the impregnating material while vibrating an impregnating material outlet of a nozzle disposed on the inner peripheral side of the stator core in a core-axis direction.

14. The method of manufacturing a stator for a rotary electric machine according to claim 13, wherein the formation step inserts a ring member that enlarges a diameter of a coil end section into an inner peripheral side of each end section of the stator coil projecting from axial-direction end surfaces of the stator core, and forms the first angle section and the second angle section.

15. The method of manufacturing a stator for a rotary electric machine according to claim 14, wherein the formation step inserts a ring member for enlarging a diameter of a coil end section into an inner peripheral side of either coil end section of the stator coil that each projects from the axial-direction end surfaces of the stator core.

16. The method of manufacturing a stator for a rotary electric machine according to claim 8, wherein the formation step inserts a ring member that enlarges a diameter of a coil end section into an inner peripheral side of each end section of the stator coil projecting from axial-direction end surfaces of the stator core, and forms the first angle section and the second angle section.

17. The method of manufacturing a stator for a rotary electric machine according to claim 8, wherein the formation step inserts a ring member for enlarging a diameter of a coil end section into an inner peripheral side of either coil end section of the stator coil that each projects from the axial-direction end surfaces of the stator core.

18. The method of manufacturing a stator for a rotary electric machine according to claim 9, wherein the formation step inserts a ring member that enlarges a diameter of a coil end section into an inner peripheral side of each end section of the stator coil projecting from axial-direction end surfaces of the stator core, and forms the first angle section and the second angle section.

19. The method of manufacturing a stator for a rotary electric machine according to claim 9, wherein the formation step inserts a ring member for enlarging a diameter of a coil end section into an inner peripheral side of either coil end section of the stator coil that each projects from the axial-direction end surfaces of the stator core.

20. The stator according to claim 4, wherein either the one end section or the other end section is formed alone.

* * * * *